(12) United States Patent
Hasegawa et al.

(10) Patent No.: US 6,766,088 B2
(45) Date of Patent: *Jul. 20, 2004

(54) OPTICAL FIBER AND METHOD FOR MAKING THE SAME

(75) Inventors: Takemi Hasegawa, Yokohama (JP);
Masashi Onishi, Yokohama (JP);
Eisuke Sasaoka, Yokohama (JP);
Masayuki Nishimura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 391 days.

This patent is subject to a terminal disclaimer.

(21) Appl. No.: 09/810,414

(22) Filed: Mar. 19, 2001

(65) Prior Publication Data

US 2001/0038740 A1 Nov. 8, 2001

Related U.S. Application Data

(60) Provisional application No. 60/246,725, filed on Nov. 9, 2000, and provisional application No. 60/252,456, filed on Nov. 22, 2000.

(30) Foreign Application Priority Data

May 1, 2000 (JP) ................................. P2000-132668
Aug. 30, 2000 (JP) ................................. P2000-261580

(51) Int. Cl.⁷ ............................................... G02B 6/02
(52) U.S. Cl. .......................... 385/123; 385/28; 385/127
(58) Field of Search ................................ 385/123, 126, 385/127, 11, 28

(56) References Cited

U.S. PATENT DOCUMENTS

| | | | |
|---|---|---|---|
| 5,742,723 A | * | 4/1998 | Onishi et al. ............... 385/127 |
| 5,802,236 A | | 9/1998 | DiGiovanni et al. |
| 5,854,871 A | | 12/1998 | Akasaka |
| 5,894,537 A | | 4/1999 | Berkey et al. |
| 5,995,695 A | | 11/1999 | Aikawa et al. |
| 6,009,221 A | * | 12/1999 | Tsuda ......................... 385/123 |
| 6,526,209 B1 | * | 2/2003 | Hasegawa et al. .......... 385/127 |

FOREIGN PATENT DOCUMENTS

| | | |
|---|---|---|
| EP | 0 630 864 A2 | 12/1994 |
| EP | 0737873 A2 | 10/1996 |
| JP | 55-133003 | 10/1980 |
| JP | 59-92940 | 5/1984 |
| WO | WO 00/16141 | 3/2000 |
| WO | WO 00/37974 | 6/2000 |

OTHER PUBLICATIONS

"Designing a photonic crystal fibre with flattened chromatic dispersion", A. Ferrando et al., Electronics Letters, Feb. 18, 1999, vol. 35, No. 4, p. 325–327.

"Profile structure of single–mode fibers with low nonlinear properties for long–haul communication lines", A.V. Belov, Optics Communications, Elsevier Science B.V., Mar. 15, 1999, p. 212–216.

International Search Report.

* cited by examiner

*Primary Examiner*—Khiem Nguyen
(74) *Attorney, Agent, or Firm*—McDermott, Will & Emery

(57) ABSTRACT

An optical fiber has a section of the first kind having a chromatic dispersion not less than a given positive value x and a negative chromatic dispersion slope at a given wavelength and a section of the second kind has a chromatic dispersion not more than −x and a positive chromatic dispersion slope at the same wavelength. Another optical fiber has a chromatic dispersion higher than a positive value x and a negative chromatic dispersion slope at a given wavelength band.

8 Claims, 13 Drawing Sheets

OPTICAL FIBER AND METHOD FOR MAKING THE SAME

CROSS-REFERENCE TO RELATED APPLICATION

This application claims priority to Provisional Application Serial No. 60/246,725 filed Nov. 9, 2000, and No. 60/252,456 filed Nov. 22, 2000, which are hereby incorporated by reference in their entirety.

BACKGROUND OF THE INVENTION

1. Field of the Invention

The present invention relates to an optical fiber suitable as an optical transmission path and a method for making such an optical fiber.

2. Related Background Art

Conventionally, a dispersion managed fiber as an optical transmission path composed of plural fiber sections having different fiber characteristics at respective sections and can solve problems not solvable by an optical fiber composed of a single kind of section is disclosed in U.S. Pat. No. 5,894,537, for example. In this dispersion managed fiber, a dispersion managed transmission path is constituted of sections having a positive chromatic dispersion and sections having a negative chromatic dispersion, so that the deterioration in transmission characteristics due to the nonlinear optical interaction among optical signals having different wavelengths and the distortion of optical pulses due to total chromatic dispersion can be reduced simultaneously.

Among methods for making such a dispersion managed fiber, following two methods are provided, for example. The first is a method which changes the refractive index of the core region along the fiber axis. For example, the core region is doped with such materials that the refractive index of core region changes by exposure to ultraviolet radiation. The fiber is exposed to ultraviolet radiation after fiber drawing so as to obtain a desired refractive index. The second is a method which changes the diameter of the core region along the fiber axis.

However, both of the above-mentioned two methods have problems as follows. In the first method, usually, since the change in refractive index induced by exposure to ultraviolet radiation is approximately $10^{-3}$ and hence is small, it is difficult to change the chromatic dispersion widely along the fiber axis. Accordingly, the absolute value of the local chromatic dispersion cannot be increased and hence, it is impossible to sufficiently suppress the nonlinear optical interaction among optical signals having different wavelengths. Further, it is also difficult to change the sign of the chromatic dispersion slope along the fiber axis so that the total chromatic dispersion slope increases. As a result, the wavelength bandwith sufficiently small total chromatic dispersion gets narrow and hence, the capacity of the transmission path becomes small.

Further, in the second method, it is difficult to have the cross-sectional distribution of refractive index change drastically along the fiber axis. To realize a negative chromatic dispersion slope, the refractive index distribution having a depressed portion, i. e., a refractive index distribution having, between the core region having a high refractive index and the outer cladding region having a low refractive index, an inner cladding region (the depressed portion) whose refractive index is lower than the outer cladding region is suitable. On the other hand, to realize a positive chromatic dispersion slope, the refractive index distribution having no depressed portion, i. e., the refractive index distribution where the refractive index takes the minimum in the outer cladding region is suitable. However, it is usually difficult to make a preform where a section has a refractive index distribution having a depressed portion and another section has a refractive index distribution having no depressed portion. Accordingly, the absolute value of total chromatic dispersion slope becomes large and the wavelength band with sufficiently small absolute value of total chromatic dispersion becomes narrow.

Further, as the change in the chromatic dispersion along the fiber axis becomes steeper, the fabrication of the fiber becomes more difficult. For example, when the preform diameter is 50 mm and the fiber diameter is 125 $\mu$m, to realize a change in chromatic dispersion at a period of 640 m along the fiber axis, it is necessary to change the ratio of the core diameter to the cladding diameter in the preform at a period of 4 mm along the preform axis. Accordingly, in case of grinding the core preform, a minute processing technique becomes necessary, and in case of elongating the core preform, a highly position-selective heating technique becomes necessary. Further, the shorter the period of the change in the chromatic dispersion along the fiber axis, the number of the parts in the preform to be processed increases so that the fabrication becomes laborious.

Conventionally, there has been known a dispersion compensating fiber which has negative chromatic dispersion and negative chromatic dispersion slope to compensate for positive chromatic dispersion and positive chromatic dispersion slope as disclosed in U.S. Pat. No. 5,995,695. However, a dispersion compensating fiber having positive chromatic dispersion and negative chromatic dispersion slope has not been known and hence, it has been difficult to compensate for negative chromatic dispersion and positive chromatic dispersion slope. A dispersion managed fiber including sections having positive chromatic dispersion and negative chromatic dispersion slope and sections having negative chromatic dispersion and positive chromatic dispersion slope has not been known either. Accordingly, in the conventional dispersion managed fiber, locally-zero-dispersion wavelength, at which local chromatic dispersion becomes substantially zero, is present in the short wavelength side of the operating wavelength range. The band in the vicinity of this wavelength is not suitable for the wavelength division multiplexing transmission because of the deterioration of the transmission quality due to the four-wave mixing or the cross phase modulation and hence, the conventional dispersion managed fiber cannot expand its operating wavelength range to the short-wavelength side.

So-called microstructured optical fiber, which has a high degree of freedom in setting the local chromatic dispersion is disclosed in U.S. Pat. No. 5,802,236. This microstructured optical fiber has microstructures (usually voids) in a cladding region and it is possible to increase the effective refractive index difference between the core region and the cladding region. As a result, this optical fiber can realize large absolute value of the chromatic dispersion and small mode field diameter.

A method for manufacturing such a microstructured optical fiber is disclosed in U.S. Pat. No. 5,802,236, wherein tubes and a rod are bundled to form a preform from which a microstructured fiber is drawn. Another method of making a microstructured fiber is disclosed in the International Publication WO00/16141 wherein a plurality of rods of given shape are bundled to form a preform from which a microstructured fiber is drawn.

SUMMARY OF THE INVENTION

In a microstructured optical fiber, to obtain desired characteristics with respect to chromatic dispersion or mode field diameter, it is important to accurately control the area fraction of void in the fiber, which is the ratio of the area occupied by the void to the area of a given region in the fiber cross section.

However, in the conventional method in U.S. Pat. No. 5,802,236, it is difficult to accurately control the area fraction of void because of the gaps among the tubes. To prevent the gaps among tubes from remaining in the drawn fiber, it is necessary to raise the pressures in the voids of the tubes above those in the gaps. However, such an operation is difficult because it requires selective manipulation of pressure in the preform. On the other hand, when the fiber is drawn so that the gaps among tubes remain as the voids in the fiber, it becomes unnecessary to perform the selective manipulation of pressure. However, it is difficult to maintain close contact of tubes so that the structure in the cross section of the preform is tend to be disordered. The same problems arise also in the method disclosed in the above-mentioned International Publication WO00/16141.

Further, to enhance the strength of the drawn optical fiber and to prevent the fiber from breaking during fiber drawing, it is desirable to raise the drawing temperature. However, when the temperature of the preform rises, the viscosity of the preform is decreased and the voids are apt to be collapsed. Accordingly, increase in the pressure inside the voids is necessary to raise the drawing temperature. However, as mentioned above, since selective manipulation of pressure is difficult in the conventional technique which forms the preform with tubes and/or rods, increase in the pressure inside the voids also elevates that in the gaps, so that the drawn fiber tends to have unintentional voids corresponding to the gaps in the preform and the microstructure in the cross-section of the drawn fiber tends to be disordered. As a result, it is impracticable to enhance the strength of the fiber by raising the drawing temperature.

As described above, conventionally, it has been difficult to fabricate a microstructured optical fiber which realize optical properties like local chromatic dispersion and mode field diameter as desired. It is much more difficult to realize the dispersion managed optical fiber whose optical properties are deliberately varied along the fiber length.

The present invention has been made in view of the above and it is an object of the present invention to provide a dispersion managed fiber with small total chromatic dispersion slope and a dispersion managed fiber which enables expansion of the operating wavelength band to the short wavelength side, a dispersion compensating fiber which realizes compensation of negative chromatic dispersion and positive chromatic dispersion slope, and a method of making such optical fibers easily and securely.

That is, the optical fiber according to the present invention is an optical fiber composed of at least a section of the first kind having chromatic dispersion not less than a given positive value x and negative chromatic dispersion slope at a given wavelength, and at least a section of the second kind having chromatic dispersion not more than −x and positive chromatic dispersion slope at said given wavelength.

According to such a constitution, distortion of optical pulse due to total chromatic dispersion and deterioration in transmission quality due to the nonlinear optical phenomena can be suppressed over a wide wavelength range, which can be used for the operating wavelength band. Further, the wavelength band adjacent to the operating band in the short wavelength side can be made free of the locally-zero dispersion wavelength at which local chromatic dispersion substantially becomes zero. In the wavelength band in the vicinity of the locally-zero dispersion wavelength, deterioration of transmission quality due to the above-mentioned nonlinear optical phenomena is liable to occur and hence such a wavelength band is not suited for wavelength division multiplexing. However, according to the optical fiber of the present invention, since the wavelength band in the short wavelength side of the operating band can be made free of the locally-zero dispersion wavelength, it becomes possible to expand the operating wavelength band toward the short wavelength side to meet an increase in demand.

Such an optical fiber can be realized by, for example, an optical fiber composed of a core and a cladding which surrounds the core and has a mean refractive index lower than that of the core, at least one of the core and cladding includes regions spaced apart in cross section and made of sub mediums whose refractive indices are different from those of main mediums constituting the optical fiber, and at least one of the cross-sectional areas and refractive indices of the regions made of the sub mediums change along the fiber axis.

Here, the main mediums are mediums which can practicably constitute an optical fiber by themselves such as silica glass. An optical fiber has to contain at least and not more than one region made of the main medium. On the other hand, the sub mediums are present in regions surrounded by the main mediums may be mediums which can not practicably constitute an optical fiber by themselves, such as gas. Vacuum also can be employed as sub medium.

By changing at least one of the cross-sectional areas and the refractive indices of regions made of the sub mediums along the fiber axis, a large change in chromatic dispersion along the fiber axis can be realized so that large local chromatic dispersion is realized whereby the nonlinear optical interaction among optical signals having different wavelengths can be sufficiently suppressed. Further, it becomes easy to drastically change the cross-sectional distribution of refractive index along the fiber axis. Accordingly, an optical fiber where the cross-sectional distribution of refractive index has a depressed portion in some fiber sections and does not have a depressed portion in other fiber sections can be easily realized. As a result, change in the sign of chromatic dispersion slope along the fiber axis can be realized, so that total chromatic dispersion slope can be sufficiently made small. Accordingly, the wavelength band with small absolute value of total chromatic dispersion can be broadened, resulting in increased transmission capacity.

It is preferable that the chromatic dispersion at this given wavelength is larger than 1 ps/nm/km in the section of the first kind and smaller than −1 ps/nm/km in the section of the second kind and the total length of the fiber sections whose absolute values of the chromatic dispersion are below 1 ps/nm/km is less than 1/10 of the full length of the optical fiber.

In this manner, the lengths of respective fiber sections and the chromatic dispersion values are designed so that the absolute value of local chromatic dispersion becomes large and the absolute value of total chromatic dispersion becomes small. As a result, an optical fiber where the deterioration of transmission quality due to the nonlinear optical phenomena among optical signals having different wavelengths and the distortion of optical pulses due to total chromatic dispersion are both reduced can be realized. Such an optical fiber can be suitably used as a transmission path for a large capacity optical communication.

Here, it is preferable that sections which do not contain sub mediums are spaced apart along the fiber axis. Such an optical fiber can be cleaved at the section which does not contain sub mediums in cross section and spliced to another optical fiber by fusion. Splicing is difficult in the conventional microstructured optical fiber because the microstructures make it difficult to observe the core for alignment and because the microstructures tend to be deformed and/or collapsed due to fusion resulting in weakened optical confinement and increased optical attenuation. On the other hand, in the present fiber, the problems of the deformation or collapse of microstructures due to fusion and difficulty in observing the core do not arise, so that fusion splice can be easily performed and optical attenuation at the splice can be made small.

It is preferable that at least one of the cross-sectional areas and the refractive indices of the regions made of the sub mediums change at a given period along the fiber axis and the other are uniform or change at same period along the fiber axis. According to such a constitution, an optical fiber having the local chromatic dispersion periodically changed along the fiber axis can be realized. In such an optical fiber, even when the fiber length is changed by an integer times of the period of the dispersion change, the wavelength at which total chromatic dispersion becomes zero is not changed. Since the change of the chromatic dispersion characteristics of the transmission path due to the change of the length of the transmission path can be reduced, it becomes easy to change the length of the transmission path without affecting the transmission quality. It is preferable that this period exceeds 1 m.

It is preferable that the optical fiber has at least a transition section of a given length or more where at least one of the cross-sectional areas and the refractive indices of the regions made of the sub mediums change continuously along the fiber axis and the other are uniform or change continuously along the fiber axis. According to such a constitution, change in the cross-sectional area and the refractive index distribution along the fiber axis can be made sufficiently mild so that the loss due to the mode coupling at the transition sections can be reduced. As a result, the transmission loss across the whole fiber can be reduced.

The optical fiber may be constituted such that the main medium is silica glass and the sub medium is air. According to such a constitution, by adjusting the furnace temperature or pressure in voids during fiber drawing, the cross-sectional areas of the voids can be easily changed along the fiber axis. Since the relative index difference between silica glass and air is as large as approximately 35%, it is possible to drastically change the chromatic dispersion by changing the cross-sectional areas of the voids. As a result, the change of the chromatic dispersion characteristics along the fiber axis can be made more drastic than that in the conventional dispersion managed fiber. Further, since the transparency of silica glass and air is high, the transmission loss of the optical fiber can be suppressed.

Further, the optical fiber may have the chromatic dispersion not less than a positive value x and the negative chromatic dispersion slope at a given wavelength. According to such a constitution, it becomes possible to compensate for negative chromatic dispersion and positive chromatic dispersion.

Such an optical fiber can be realized by an optical fiber composed of a core and a cladding surrounding the core and having a lower mean refractive index than that of the core, wherein at least one of the core and the cladding has regions spaced apart in cross section and made of sub mediums whose refractive indices are different from those of main mediums constituting the core and the cladding.

According to such a constitution, large waveguide dispersion can be realized so that an optical fiber having positive chromatic dispersion and negative chromatic dispersion slope can be realized. Further, the absolute values of chromatic dispersion and chromatic dispersion slope can be made large, so that the fiber length required for compensation of dispersion and dispersion slope can be shortened.

The optical fiber of the present invention can be made by a method for making an optical fiber having voids extending along the fiber axis, comprising the steps of preparing the preform having a plurality of voids whose cross-sectional areas are uniform along its axis, and drawing the optical fiber from this preform, wherein a means to measure the area fraction of voids in the drawn optical fiber, a means to adjust the pressure in the voids of the preform and a means to feedback the measured area fraction of voids to adjusting means are included.

The cross-sectional areas of voids in the drawn optical fiber depend on the pressure in the voids during fiber drawing. Accordingly, by adjusting the pressure in voids during the fiber drawing, the cross-sectional areas of the voids in the drawn optical fiber can be varied as desired. Further, since it is unnecessary to change the cross-sectional structure of the preform along its axis, the optical fiber can be easily fabricated compared to the conventional fabrication technique. Further, since the pressure in voids can be changed rapidly, the structure in which the cross-sectional distribution of the refractive index of the fiber changes steeply along the fiber axis can be easily fabricated. As a result, the method is suitable as a method for manufacturing the above-mentioned optical fiber according to the present invention. Further, since the area fraction of the voids in the drawn optical fiber is measured and the result of the measurement is feedbacked to the pressure adjusting means, the fluctuation in the structure of the drawn optical fiber along its axis due to the fluctuation in the structure of the preform along its axis and the temporal fluctuation in the fiber drawing environment can be suppressed, whereby an optical fiber with desired optical characteristics can be fabricated with high yields. The area fraction of the voids is defined in the cross-section of a preform or a fiber as the ratio of the total area of the voids to the area of the cross section.

Alternatively, the method of making an optical fiber according to the present invention is a method of making an optical fiber which contains a plurality of regions made of sub mediums whose refractive indices differ from those of main mediums constituting the optical fiber comprising the steps of preparing a preform having a plurality of regions made of sub mediums whose cross-sectional areas are constant along the preform axis, and drawing the optical fiber from this preform, wherein a means to adjust the heating condition through varying at least one of the temperature of the drawing furnace for heating the preform and the time length for the fiber to pass the drawing furnace is included.

Change in the cross-sectional areas of the sub-medium regions during fiber drawing depends on the temperature in the drawing furnace and the time length to heat the preform. By changing at least either of the temperature in the drawing furnace and the time length to heat the preform, it is possible to change the cross-sectional areas of the sub-mediums in the drawn optical fiber along the fiber axis. As a result, the above-mentioned optical fiber according to the present invention can be favorably fabricated.

Here, it is desirable to measure the area fraction of voids or sub-medium regions in the drawn optical fiber, and feedback control the temperature in the drawing furnace and/or the time for heating the preform with the area fraction of voids or sub-medium regions thus measured. According to such an operation, the fluctuation in the structure of the drawn optical fiber along its axis due to the fluctuation in the structure of the preform along its axis and temporal fluctuation in the fiber drawing environment can be suppressed, whereby an optical fiber with desired optical characteristics can be fabricated with high yields.

For obtaining the area fraction of voids or sub-medium regions in the drawn optical fiber, the following means can be employed. In the first means, the speed at which the preform is supplied, the speed at which the fiber is drawn and the fiber diameter during fiber drawing are measured, and the area fraction of voids (or sub-medium regions) in the drawn optical fiber is calculated from these measured values, the preform diameter and the area fraction of voids (or sub-medium regions) in the preform, wherein the latter two quantities are measured before fiber drawing. Since the glass volume of the fiber drawn during a given period is equal to the glass volume of the preform supplied during the same period, the area fraction of the voids (or sub-medium regions) in the drawn fiber can be obtained from measurement of the above-mentioned quantities. In the second means, the speed at which the fiber is drawn, the fiber diameter, the drawing tension and the temperature in drawing furnace during fiber drawing are measured, and the area fraction of voids (or sub-medium regions) in the drawn optical fiber is calculated from these measured values. Since the drawing tension is related to the area fraction of voids (or sub-medium regions), the drawing speed, and the furnace temperature, the area fraction is obtained from measurement of the above-mentioned quantities. Since the area fraction of voids or the sub-medium regions can be grasped during the fiber drawing with above-mentioned techniques, an optical fiber with desired optical characteristics can be fabricated with high yields by them to the fiber drawing conditions.

Further, it is preferable that the method according to the present invention further comprises the preprocessing step of making a preform in a single piece, boring three or more voids in the preform along its axis, and cleaning the surfaces of the preform at the voids, and the drawing step includes a means to prevent contaminants from intruding into these voids.

The preform fabricated in this manner, different from those made by the conventional method of bundling tubes and/or rods, have no voids formed by the gaps among the tubes and/or the rods. Accordingly, it becomes easy to control the area fraction of voids in the drawn fiber to the desired amount, whereby an optical fiber with desired optical characteristics can be fabricated with high yields. Further, since the cleaning the wall surfaces of the voids is facilitated, the optical fiber with low transmission loss can be fabricated. And since the preform is formed in a single piece, the reproducibility of the fabrication can be also enhanced.

For boring the voids in the preform, it is desirable to insert boring appliances into the preform at a temperature above the glass softening point, and pull out the boring appliances from the preform immediately before or after lowering the temperature of the preform. Since the viscosity of the preform is low when it is bored, the energy required for boring can be reduced and thin and deep voids with uniform diameter can be easily formed so that the yields of the obtained optical fiber can be enhanced.

Alternatively, the method of making an optical fiber according to the present invention is a method of making an optical fiber which contains a plurality of regions made of sub mediums having refractive indices different from those of main mediums constituting the core and the cladding, comprising steps of injecting a medium whose refractive index is changeable on exposure to radiation into given regions of the optical fiber, and varying the refractive index of said injected medium along the fiber axis by exposing the fiber to radiation.

Here, since the desired refractive index profile can be obtained by injecting the medium having a large sensitivity of the refractive index change on exposure to radiation such as electromagnetic wave and electron ray, and thereafter exposing the optical fiber to radiation, compared with a case in which an optical fiber is constituted only by silica glass, the change in the cross-sectional distribution of refractive index along the fiber axis can be increased. Further, the change of the refractive index is performed not on the preform but on the fiber so that the optical fiber can be fabricated easily even with a structure where the change in the cross-sectional distribution of refractive index along the fiber axis is steep.

Alternatively, the method of making an optical fiber according to the present invention is a method for making an optical fiber having a plurality of voids, comprising the step of closing the voids by heating and fusing the drawn optical fiber selectively at a plurality of portions spaced apart along the fiber axis.

According to such a constitution, the cross-sectional areas of the voids along the fiber axis can be changed after drawing the optical fiber. According to the present invention, it is unnecessary to change the fiber drawing environment during fiber drawing to produce the change of the cross-sectional areas of the voids along the fiber axis and hence, the optical fiber can be easily fabricated. Further, the change of the refractive index is performed not on the preform but on the fiber so that the optical fiber can be fabricated easily even an optical fiber whose cross-sectional distribution of the refractive index distribution changes steeply along the fiber axis can be easily fabricated.

DESCRIPTION OF THE PREFERRED EMBODIMENTS

Figure 1:
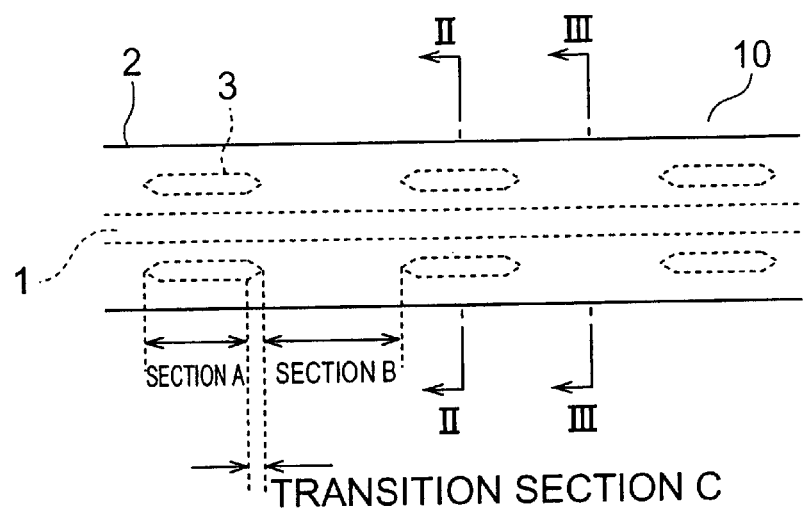
FIG. 1 is a longitudinal cross-sectional view of a microstructured optical fiber according to the present invention.

Preferred embodiments of the present invention are explained in detail hereinafter in conjunction with attached drawings. To facilitate the comprehension of the explanation, the same reference numerals denote the same parts, where possible, throughout the drawings, and a repeated explanation will be omitted.

Figure 2:
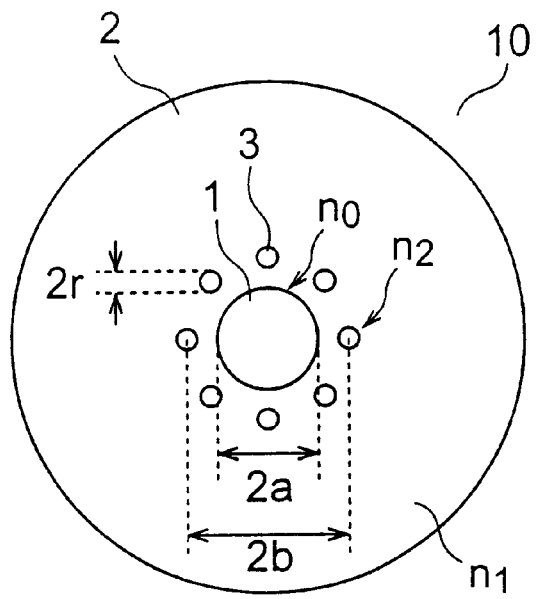
FIG. 2 and FIG. 3 are respectively cross-sectional views taken along lines II—II and III—III of FIG. 1.
Figure 3:
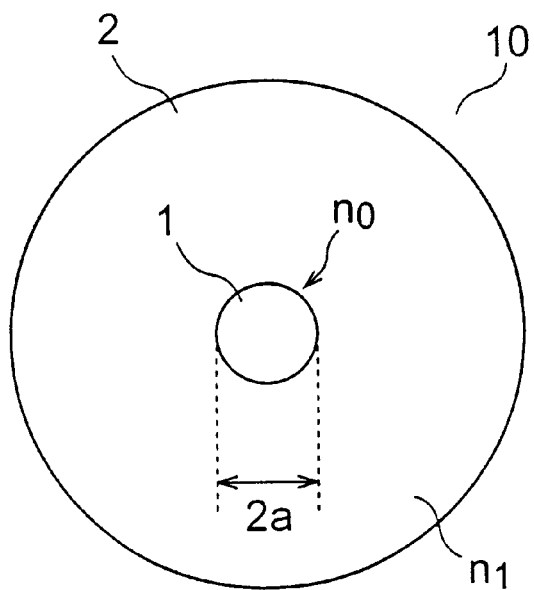

FIG. 1 is a cross-sectional view along the fiber axis (a longitudinal cross-sectional view) of an optical fiber 10 of the present invention. Further, FIG. 2 and FIG. 3 are transverse cross-sectional views of the optical fiber 10 in FIG. 1 taken along a line II—II and a line III—III.

The optical fiber 10 is composed of a core region 1 and a cladding region 2 which surrounds the core region 1. The core region 1 is made of silica glass doped with Ge. In the cladding region 2, a plurality (N pieces) of voids 3 are arranged within a cross section in pure silica glass which constitutes a main medium, wherein each void 3 opens at a section A and transition sections C which sandwich the section A along the axial direction as will be explained later. The medium in the voids 3 (hereinafter called "sub medium") is air.

As shown in FIG. 1, in the optical fiber 10 of the embodiment 1, sections A and sections B are alternately arranged along the fiber axis, wherein the cladding region 2 in the sections A encloses the voids 3, the cladding region 2 in the sections B is made only of the main medium and does not include the voids 3. Transition sections C are present between sections A and sections B, wherein the cross sectional areas of the voids 3 decrease along the fiber axis toward the section B. The length of the section A and the section B is typically not less than 100 m. On the other hand, it is preferable that the length of the transition section C is not more than 1 m. In this manner, by making the length of the transition section C short compared to that of the section A and the section B, the influence by the optical characteristics of the transition section C on the optical characteristics of the whole optical fiber 10 can be made negligible.

Figure 4A:
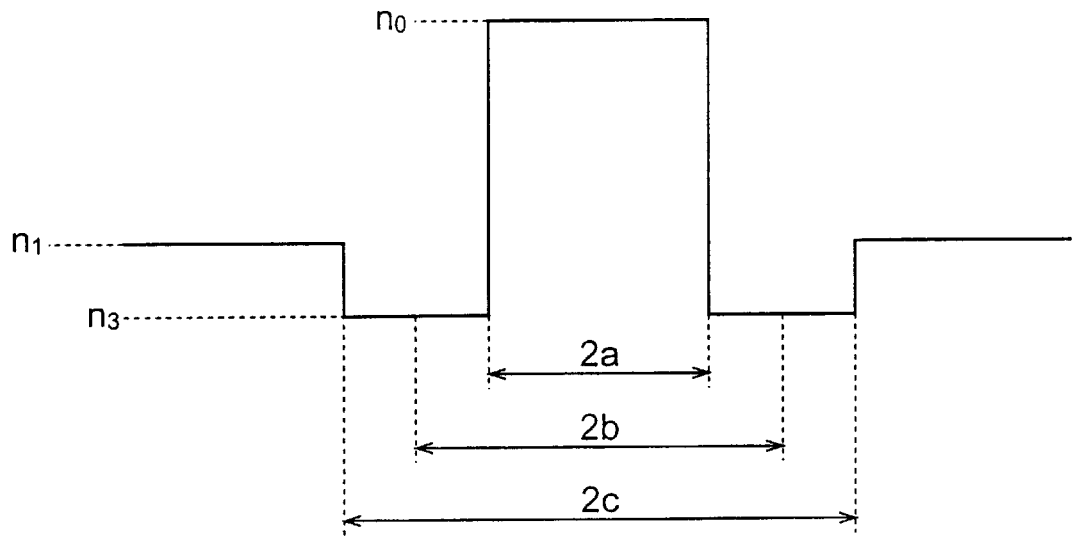
FIG. 4A and FIG. 4B are views for respectively explaining the refractive index profiles at positions in FIG. 2 and FIG. 3.
Figure 4B:
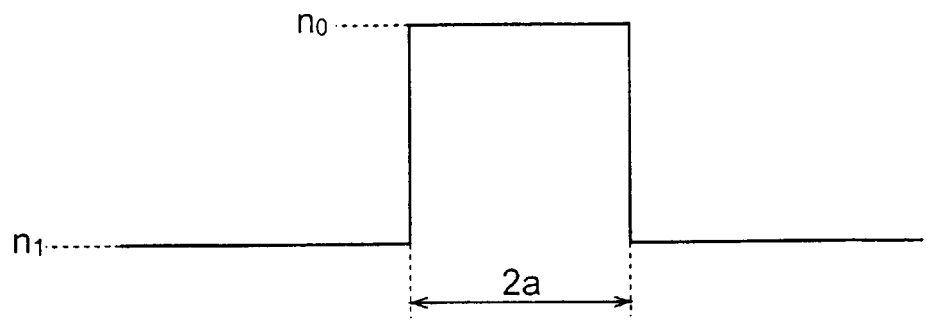

The diameter of the core region 1 is $2a$ (for example, $a=1.74$ $\mu$m) and the diameter takes the same value in the sections A and the sections B. As shown in FIG. 2, in the sections A, 8 pieces of voids 3 having a radius r (for example, $r=0.39$ $\mu$m) are arranged at a constant interval on a circumference centered at the fiber axis and having a radius b (for example, $b=2.81$ $\mu$m). Since the diameters of the voids 3 are small compared to the dimension of the fiber, the fiber is called a microstructured optical fiber. Respective refractive indices $n_0$, $n_1$, $n_2$ of the main medium of the core region 1, the main medium of the cladding region 2 and the voids 3 are, for example, $n_0=1.465$ (doped with 14 mol % of Ge), $n_1=1.444$ and $n_2=1.0$. The cross-sectional distribution of the refractive index in the sections A corresponds to the refractive index profile with a depressed portion (see FIG. 4A) which constitutes a circular annular region (radius being $2c$) including the voids 3, while the cross-sectional distribution of the refractive index in the section B corresponds to the refractive index profile without such depressed portion (see FIG. 4B) since the section B has no voids 3. The mean refractive index $n_3$ of the depressed portion which is given by $$n_3 = \sqrt{n_1^2 - \frac{Nr^2}{c^2 - a^2}(n_2^2 - n_1^2)} \quad \text{is } n_3 = 1.405,$$

where $c = 2b - a$ is assumed.

Figure 5:
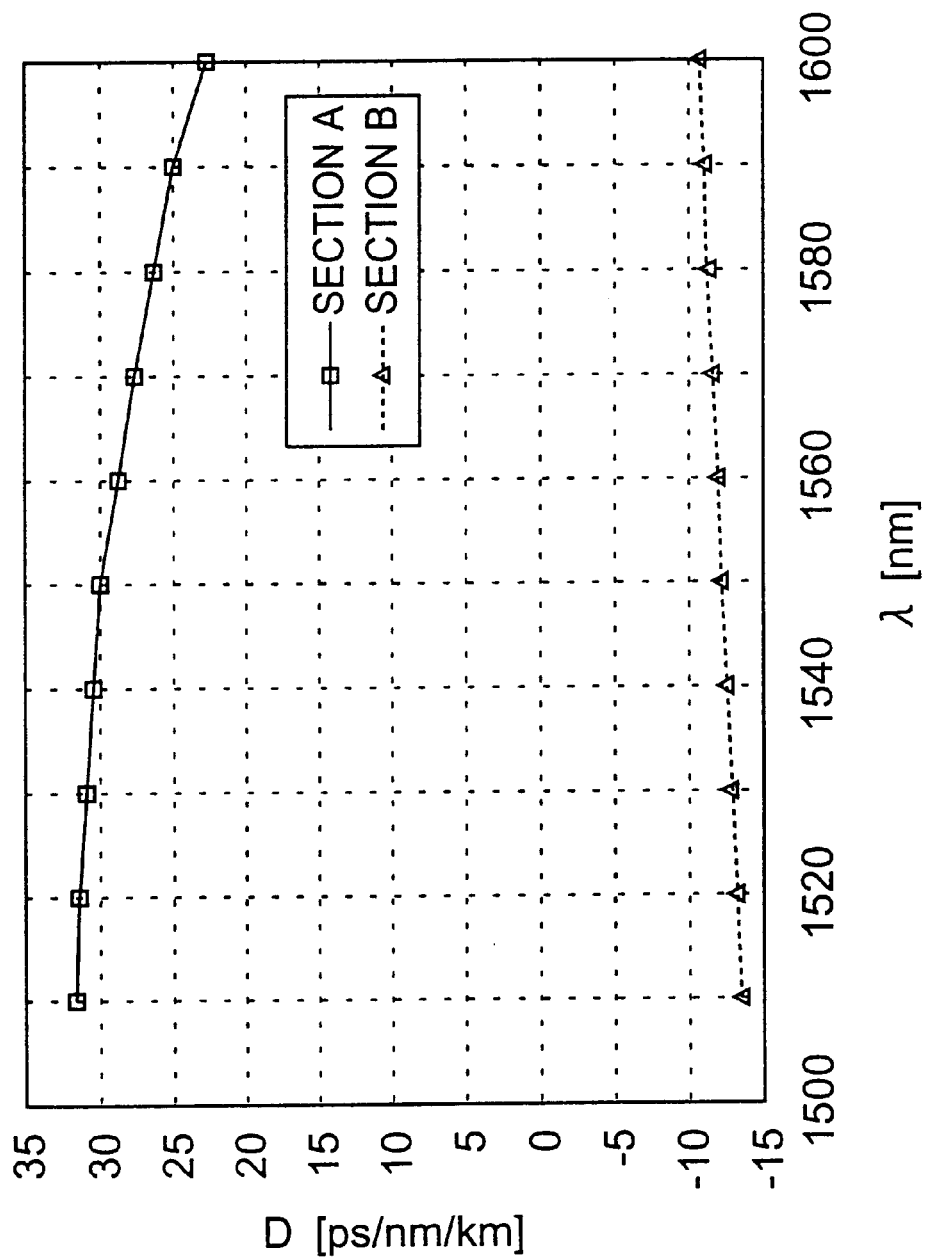
FIG. 5 is a graph showing a result of a numerical simulation of the chromatic dispersion characteristics in a preferred embodiment of the microstructured optical fiber according to the present invention.

FIG. 5 is a view showing the result of a numerical simulation on the chromatic dispersion characteristics of the sections A and the sections B of the optical fiber 10. Here, FIG. 5 shows the result when the wavelength range is set from 1510 nm to 1600 nm. As can be readily understood from the drawing, the section A has the positive chromatic dispersion D and the negative chromatic dispersion slope $S=dD/d\lambda$, while the section B has the negative chromatic dispersion D and the positive chromatic dispersion slope S. Particularly, the chromatic dispersion D and the chromatic dispersion slope S at the wavelength 1550 nm are as follows: $D=+29.7$ ps/nm/km and $S=-0.079$ ps/nm$^2$/km in the sections A, $D=-12.4$ ps/nm/km and $S=+0.033$ ps/nm$^2$/km in the sections B. Since the locally-zero dispersion wavelength is present at the long wavelength side of the operating wavelength range from 1510 nm to 1600 nm, it becomes possible to expand the operating wavelength range to the short wave side.

Figure 6:
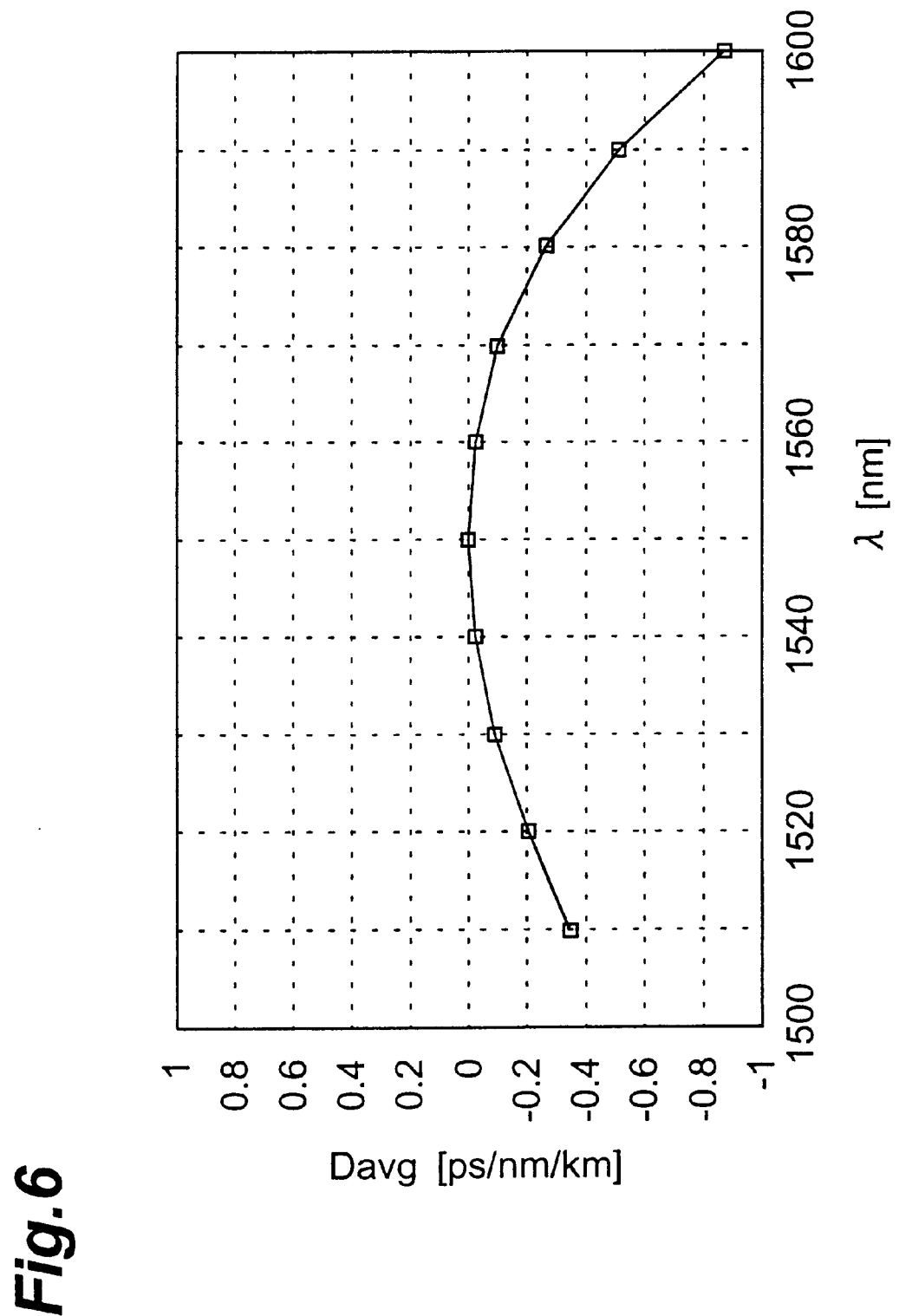
FIG. 6 is a graph showing a result of a numerical simulation of mean chromatic dispersion in a preferred embodiment of the microstructured optical fiber according to the present invention.

FIG. 6 is a view showing a mean chromatic dispersion $D_{avg}$ of the optical fiber when the sections A having a length of 0.42 is combined to the sections B having a length of 1. The mean chromatic dispersion $D_{avg}$ and the mean chromatic dispersion slope $S_{avg}$ become substantially zero at the wavelength 1550 nm, where the mean chromatic dispersion and the mean chromatic dispersion slope are defined as the chromatic dispersion and the chromatic dispersion slope of the whole fiber divided by the fiber length, respectively. Accordingly, in the optical fiber transmission path having the sections A and the sections B at the above-mentioned ratio, the absolute value of the mean chromatic dispersion in the wide wavelength range from 1510 nm to 1600 nm is not more than 1 ps/nm/km. On the other hand, as shown in FIG. 5, the absolute value of the local chromatic dispersion is 10 ps/nm/km or more and hence is large. Although the absolute value of the local chromatic dispersion is small (for example, not more than 1 ps/nm/km) in the partial fiber sections corresponding to the transition sections C, the length of such fiber sections can be made short (for example, not more than 1 m) compared to the length of sections A and B (typically, more than 100 m) so that the influence of the nonlinear optical phenomena in the transition sections C can be ignored. Accordingly, the distortion of optical pulses due to the total chromatic dispersion and the deterioration of the transmission quality due to the nonlinear optical interaction among optical signals having different wavelengths can be suppressed simultaneously.

In this manner, according to the optical fiber 10 of this embodiment, since the cross-sectional distribution of the refractive index of the fiber can be largely changed along the fiber axis, chromatic dispersion and its dependency on wavelength can be largely changed along the fiber axis. Accordingly, the chromatic dispersion characteristics which is difficult or impossible to realize with an optical fiber made of a single kind of fiber section can be realized. Particularly, the characteristics that the absolute value of the local chromatic dispersion is large and the absolute value of total chromatic dispersion is small can be realized.

Further, by properly designing the change of the chromatic dispersion and its dependency on wavelength along the fiber axis, an optical fiber which has fiber sections A where the chromatic dispersion in a wavelength range from 1510 nm to 1600 nm is larger than 10 ps/nm/km and fiber sections B where the chromatic dispersion in this wavelength range is smaller than −10 ps/nm/km and has absolute value of the mean chromatic dispersion in this wavelength range which is smaller than 1 ps/nm/km can be realized. In the optical fiber 10 of this embodiment, by largely changing the cross-sectional distribution of the refractive index of the fiber along the fiber axis compared with the conventional dispersion managed fiber, the chromatic dispersion and its dependency on wavelength can be largely changed along the fiber axis and hence, the absolute value of the local chromatic dispersion at each section can be made larger than that of the prior art. As a result, the distortion of optical pulses due to total chromatic dispersion can be suppressed and the deterioration of the transmission quality due to the nonlinear optical interaction among optical signals having different wavelengths can be made smaller compared to the prior art.

Further, in the optical fiber 10 of this embodiment, by largely changing the cross-sectional distribution of the refractive index of the fiber along the fiber axis compared with the conventional dispersion managed fiber, the chromatic dispersion and its dependency on wavelength can be largely changed along the fiber axis. Accordingly, an optical fiber having a following constitution can be realized. That is, the optical fiber has fiber sections A where the chromatic dispersion in a wavelength range from 1510 nm to 1600 nm is larger than 10 ps/nm/km and fiber sections B where the chromatic dispersion in this wavelength range is smaller than −10 ps/nm/km, and the absolute value of the mean chromatic dispersion of the optical fiber in this wavelength range is smaller than 1 ps/nm/km. Further, the chromatic dispersion slope in the fiber sections A in this wavelength range is negative and the chromatic dispersion slope in the fiber sections B in this wavelength range is positive. As a result, the wavelength range where the absolute value of total chromatic dispersion becomes smaller than a given value is broadened compared with that in the conventional technique and hence, the transmission capacity can be increased.

Further, in the optical fiber 10 of this embodiment, a plurality of sections B which are made of only the main medium and do not include voids are spaced apart along the fiber axis. Accordingly, the optical fiber can be cleaved at the sections B and can be spliced to another optical fiber by fusion. Here, in contrast to the conventional microstructured optical fiber, problems such as the deformation or collapse of the microstructures due to fusion and the difficulty in viewing the core for alignment due to the microstructure do not arise and hence, the fusion splice can be performed more easily than in the conventional microstructured optical fiber. Further, no voids open to atmosphere at the end surface, and hence no contaminant intrudes into the voids. Accordingly, mechanical splice with low loss can be realized using refractive index matching liquid. Further, even when a side surface is damaged in a part of the fiber section A and contaminants such as water intrude into the voids, the contaminants are prevented from spreading over the whole fiber and hence, the optical fiber can exhibit a higher tolerance to damages than the conventional microstructured optical fiber.

Further, in the optical fiber of this embodiment, the optical fiber may adopt a constitution where a plurality of unit fiber sections each of which is constituted by the section A, the transition section C, the section B and another transition section C in this order are arranged along the fiber axis. In such a constitution, the refractive indices of the voids are constant along the fiber axis and the cross-sectional areas thereof are changed periodically along the fiber axis. As a result, an optical fiber whose local chromatic dispersion is changed periodically along the fiber axis can be realized. In such an optical fiber, even when the fiber length is changed by an integer times of the length of the unit fiber section, the wavelength where total chromatic dispersion is zero does not change. Accordingly, the change in the chromatic dispersion characteristics of the transmission path caused by the change of the transmission path length can be reduced and hence, the transmission path length can be changed easily.

Assuming that the length of the unit fiber sections is not less than 1 m, the excessive transmission loss due to the mode-coupling between the propagation mode with the radiation modes can be reduced and the number of fiber sections which are included in the optical fiber of a unit length and in which the mode-couplings occur can be reduced and hence, the transmission loss can be reduced.

Further, assuming that the length of the transition sections C is not less than 0.5 m, the change in the cross-sectional areas of the voids is sufficiently gentle compared to the wavelength of light (usually, 1550 nm). As a result, the loss due to the mode-coupling in the transition sections is reduced, resulting in low transmission loss of the optical fiber.

Further, in the optical fiber 10 of this embodiment, silica glass is used as the main medium and air is used as the sub medium. Accordingly, the cross-sectional areas of the voids can be easily changed along the fiber axis by adjusting the furnace temperature or the pressure in the voids during fiber drawing. Further, since the relative refractive index difference between silica glass and air is as large as approximately 35%, the chromatic dispersion characteristics can be largely changed with a small change of the cross-sectional areas of the voids. Accordingly, compared with- the conventional dispersion managed fiber, the chromatic dispersion characteristics can be largely changed along the fiber axis. Further, since the transparency of the silica glass and air is high, the transmission loss of the optical fiber can be also suppressed to a low level.

As a modification of the optical fiber 10 of this embodiment, it may be possible to constitute an optical fiber made of only the section A. This optical fiber can realize an optical fiber which has the positive chromatic dispersion and the negative chromatic dispersion slope at a given wavelength.

Such an optical fiber is suitable for compensating for the chromatic dispersion and the chromatic dispersion slope of an optical fiber having the negative chromatic dispersion and the positive chromatic dispersion slope at this given wavelength. Since the change amount of the refractive index is small in a conventional technique which modulates the refractive index by doping fluorine or the like into the optical fiber, it has been difficult to realize an optical fiber which has positive chromatic dispersion and negative chromatic dispersion slope. According to the present invention, with the introduction of the sub medium, a large change in refractive index can be effectively formed, and hence such an optical fiber can be easily realized whereby an optical transmission path with a large capacity can be realized.

Moreover, such an optical fiber can be preferably used in optical transmission paths because the Brillouin frequency shift varies along the fiber axis. When the optical power of the transmitted signal exceeds a threshold, stimulated Brillouin scattering occurs and degrades the transmission quality, as is well known. However, because of the longitudinally changing Brillouin frequency shift, the Brillouin gain spectrum of the whole fiber length spreads out and the threshold of stimulated Brillouin scattering increases in the present fiber. As a result, the present fiber can transmit higher optical power than the conventional optical fibers which have longitudinally constant Brillouin frequency shifts. It is enabled by the present fiber to constitute an optical fiber by more than one fiber sections where each section has a length less than 10 km and the difference in Brillouin frequency shift between each neighboring sections is more than 50 MHz. Such a constitution is particularly effective for suppressing stimulated Brillouin scattering.

Although an example in which silica glass is used as the main medium and air is used as the sub medium has been explained with respect to the above-mentioned embodiments, the main medium and the sub medium are not limited to those materials. Plastic or the like can be used as the main medium besides glass, while various gases or liquid or solid bodies which have optical characteristics different from those of the main medium can be used as the sub medium. Further, the inside of the voids may be evacuated.

Hereinafter, several embodiments each of which is the method for making an optical fiber according to the present invention are illustrated.

The first embodiment of the method for making an optical fiber is a method for making a microstructured optical fiber according to the present invention.

Figure 7:
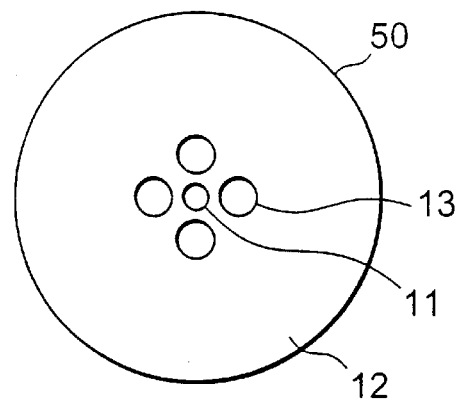
FIG. 7 is a cross-sectional view of a preform used in the fabrication method of a microstructured optical fiber according to the present invention.

FIG. 7 is a cross-sectional view of a preform 50 used in the making method of this embodiment. The preform 50 is prepared in a columnar shape and has a uniform structure along its axis. The preform 50 includes a core 11 made of silica glass doped with Ge and a cladding 12 made of pure silica glass which surrounds the core 11. Three or more (four pieces in the drawing) cylindrical voids 13 which extend along the preform axis are formed in the cladding 12. Here, the refractive index profile of the preform is of a step index type where the core 11 has a higher refractive index than the cladding 12 and the relative index difference of the core 10 is 0.323%, for example.

A base material of the preform 50 which has the core 10 having a given diameter (for example, 2.2 mm) with the cladding 12 surrounding the core 10 and having a given outer diameter (for example, 36 mm) by a VAD technique, an MCVD technique or an OVD technique.

Figure 8:
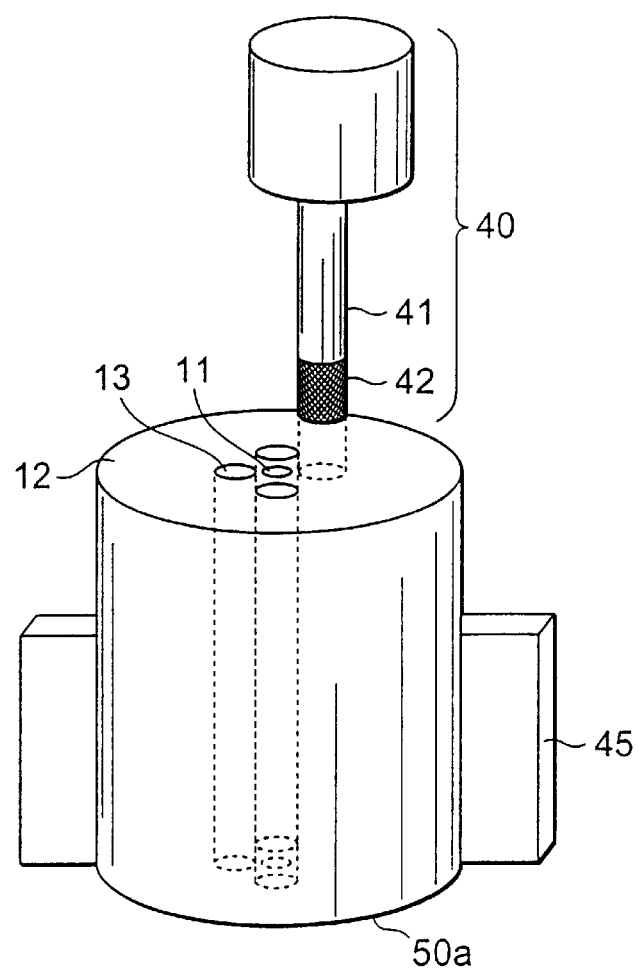
FIG. 8 is a perspective view explaining a step for boring voids in the preform shown in FIG. 7.

Subsequently, the voids 13 are formed in the cladding 12 made of the base material formed in the above-mentioned manner using boring appliance 40 shown in FIG. 8 thus forming the preform 50. This boring appliance 40 has a bar-like protruding portion 41 and a tip portion 42 made of diamond or hard metal and mounted on the distal end portion of the protruding portion 41. In forming the voids 13, the base material 50a is fixedly secured by fixing means 45 and the tip portion 42 of the boring appliance 40 is brought into contact with an end surface of the base material 50a and, thereafter, while rotating the tip portion 42 about its axis which is in parallel with the axial direction of the base material 50a, the tip portion 42 is intruded into the base material 50a along the rotary axis at a given speed thus forming a void 13 which penetrates the base material 50a along its axis. The preform 50 is formed by repeatedly forming voids 13 in this manner. The voids 13 have the diameter of 3 mm, for example, and have their centers arranged on a circumference having the radius of 3.1 mm from the center of the preform 50 in an equidistant manner (angular distance of 90 degrees).

Further, it is preferable to rotate both of the tip portion 42 and the base material 50a for suppressing the bent of the void 13 along the axis of the base material 50a. The bent of the void 13 may result in the misplacement of the voids in cross section of the optical fiber and variation in the optical properties like chromatic dispersion and birefringence. Such variation in the fiber properties is more securely prevented by rotating both of the tip portion 42 and the base material 50a.

More preferably, an automatic machine can be used for boring the void 13 in the base material 50a. Such an automatic machine has a means to store the information on how to move the boring appliance and the preform to form the voids, and a means to perform such movements according to the stored information. Because of the use of the automatic machine, the voids 13 can be formed with high reproducibility, resulting in the high yield of the optical fiber. On the other hand, the use of an automatic machine, and hence the achievement of high reproducibility, have been difficult in the conventional method of fabricating a microstructured optical fiber which is based on bundling of tubes and/or rods, because the bundling process requires delicate handling of tubes and/or rods.

The preform 50 formed in the above-mentioned manner is immersed in a bubbled hydrofluoric acid of 10% concentration for two hours so that contaminants adhered to the surfaces of the voids 13 and irregularities on the surfaces of the voids 13 can be removed (a cleaning step). After performing this cleaning step, the voids 13 are sealed at one end and the preform 50 is conveyed to a fiber drawing step which will be explained below.

Figure 9:
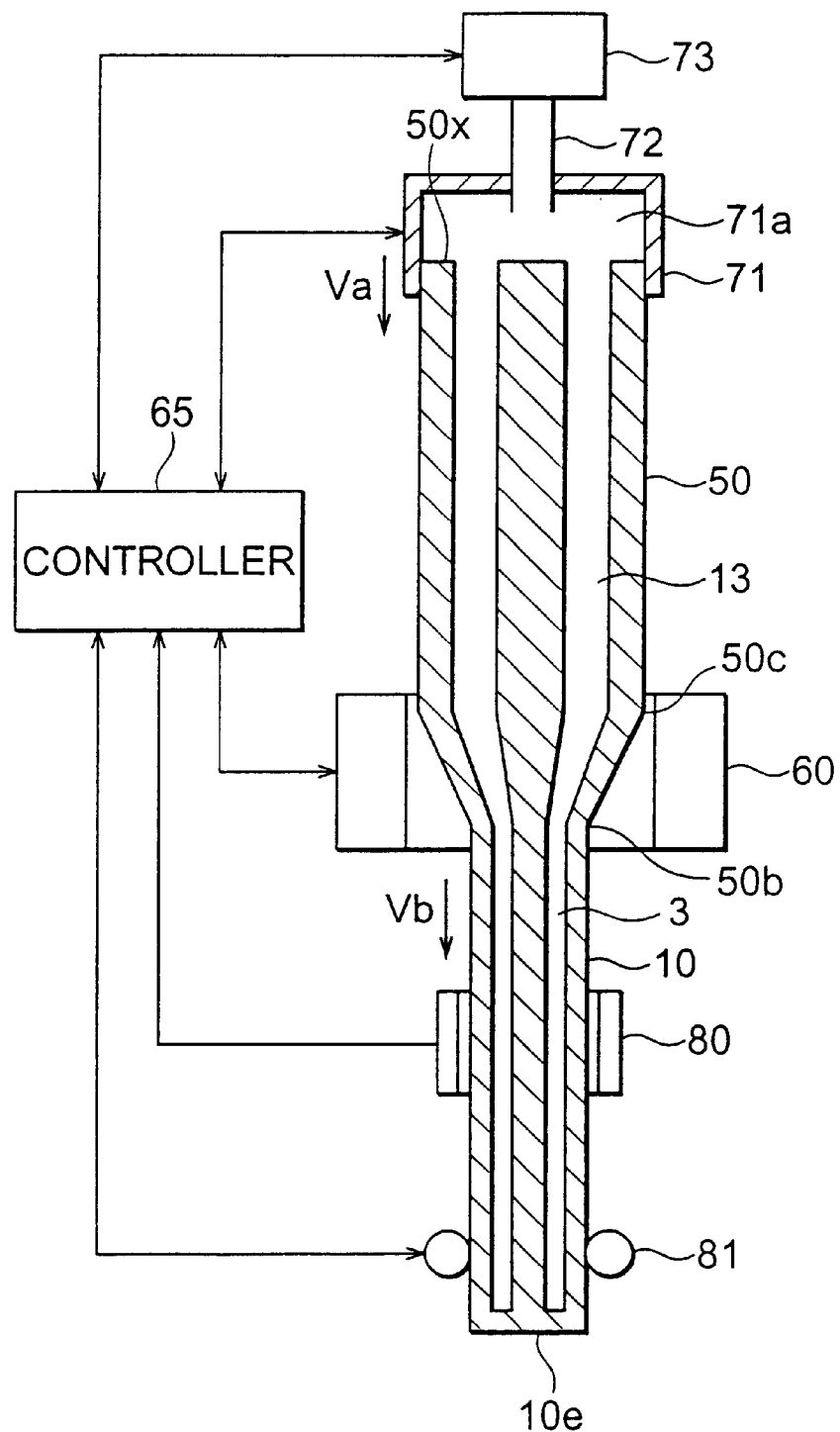
FIG. 9 is a view for explaining the fiber drawing method of a first embodiment of the fabrication method of microstructured optical fiber according to the present invention.

FIG. 9 is a view for explaining the fiber drawing step. While gripping an open-end portion 50x side of the preform 50 by preform supply means 71, the preform 50 is introduced into the fiber drawing furnace 60 from its sealed end. Here, a space 71a formed in the inside of the preform supply means 71 is communicated with the voids 13 in the preform 50. The pressure inside the voids 13 is adjusted to a given pressure by an inert gas, for example, nitrogen which is supplied from pressure adjusting means 73 through a communication tube 72 by way of the space 71a. In this embodiment, the pressure inside the voids 13 is maintained 0.4 kPa above the atmospheric pressure. In this manner, by heating the preform 50 at the sealed end using the fiber drawing furnace 60, the preform 50 has a portion from 50b to 50c thereof fused and then is pulled from the lower end side of the fiber drawing furnace 60 at a drawing speed $V_b$ which is faster than the feeding speed $V_a$ of the preform 50 to the fiber drawing furnace 60 by the preform supply means 71 and hence, the optical fiber 10 having the voids 3 which have the inner diameter of approximately 10 $\mu$m can be fabricated. Since the voids 3 are sealed at an end portion 10e of the optical fiber 10, the voids 3 and the voids 13 which are communicated with the voids 3 are maintained at the approximately same pressure as the pressure in the space 71a. The pulling-out of the optical fiber 10 is performed by towing means 81 and measuring means 80 which measures the outer diameter of the optical fiber to be fabricated is arranged between the towing means 81 and the fiber drawing furnace 60. An output of the measuring means 80 is supplied to a controller 65 which controls the whole fiber drawing step. The controller 65 fabricates the optical fiber 10 having desired characteristics by controlling the operations of the fiber drawing furnace 60, the preform supply means 71, pressure adjusting means 73 and the towing means 81.

Inventors of the present invention have found that while the area fraction of voids (the ratio of the total cross-sectional area of the voids to the cross-sectional area of the cladding) in the optical fiber 10 mainly depends on the area fraction of voids in the preform 50, the area fraction of the voids can be also adjusted even in the fiber drawing step. To reduce the area fraction of the voids, one or combination of the following techniques can be employed: (1) a technique which reduces the pressure in the voids 13 by pressure adjusting means 73, (2) a technique which elevates the temperature in the fiber drawing furnace 60, (3) a technique which reduces the supply speed $V_a$ by the preform supply means 71 or the fiber drawing speed $V_b$ by the towing means 81 so as to increase the time length (heating time) for the preform to pass the fiber drawing furnace 60. To increase the area fraction of the voids, the opposite of the above-mentioned techniques can be employed.

By changing these parameters during fiber drawing by way of the controller 65, it becomes possible to fabricate the optical fiber where the area fraction of voids change along the fiber axis so that an optical fiber whose chromatic dispersion changes along the fiber axis can be easily fabricated. Such an optical fiber is effective in suppressing the total chromatic dispersion and the four-wave mixing which deteriorates the transmission quality. Further, it may be also possible to fabricate an optical fiber having sections without voids in cross section. Such an optical fiber can separate the microstructures (voids) from the outer environment so that the contamination of the inside of the voids during splicing it and the increase of loss due to such contamination can be effectively prevented by using these portions without void for splicing.

In operation, by obtaining the area fraction of the voids in the optical fiber 10 from measurement during fiber drawing and then by performing the feedback control of the pressure in the voids 13, the furnace temperature and the time for the fiber to pass the fiber drawing furnace 60 using the controller 65 based on the obtained area fraction of the voids, the optical fiber 10 having the desired distribution of the area fraction of the voids along the fiber axis can be fabricated with a high accuracy.

Provided that the diameter $d_p$ and the area fraction of the voids $f_p$ of the preform 50 are measured before fiber drawing, the area fraction of the voids $f_f$ in the optical fiber 10 can be obtained by the following equation from the outer diameter $d_f$ of the optical fiber 10 measured by the measuring means 80, the supply speed $V_a$ of the preform 50 measured by the supply means 71 and the fiber drawing speed $V_b$ of the optical fiber 10 measured by the towing means 81.

$$f_f = f_p \times (d_p^2 V_a / d_f^2 V_b)$$

Figure 10:
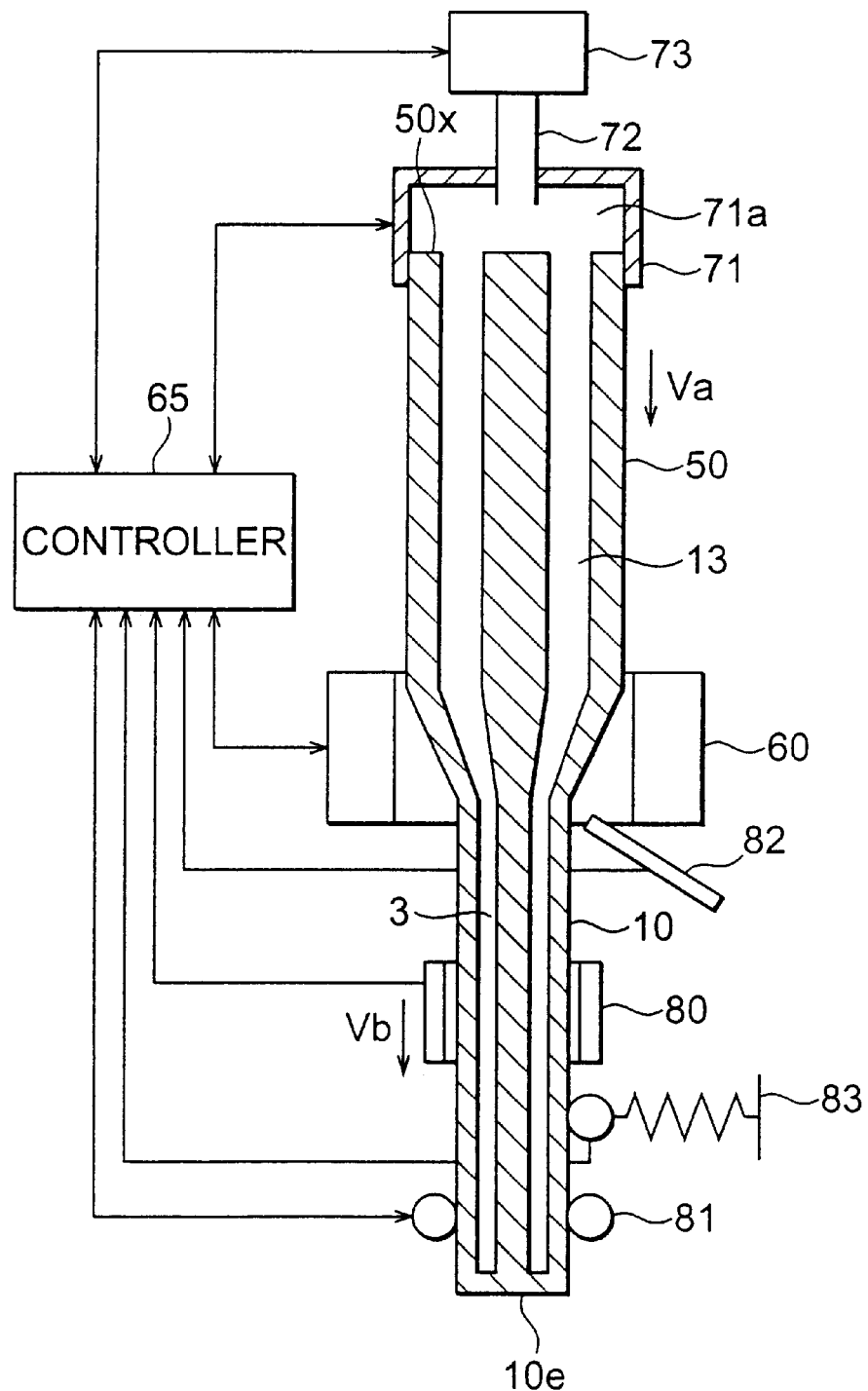
FIG. 10 is a view for explaining the fiber drawing method of a second embodiment of the fabrication method of microstructured optical fiber according to the present invention.

FIG. 10 is a view for explaining a fiber drawing method of a second embodiment which is a modification of the first embodiment. A fiber drawing device shown in the drawing is constituted by adding a radiation thermometer 82 which measures a furnace temperature (practically, a temperature of a fused lower end 50b of the preform 50) of the fiber drawing furnace 60 and a dynamometer 83 which measures a tension given to the optical fiber 10 to be fabricated to the fiber drawing device shown in FIG. 9. The outputs of the radiation thermometer 82 and the dynamometer 83 are given to the controller 65. In the second embodiment using such a device, the area fraction of the voids $f_f$ is obtained by the method described above and this area fraction of the voids $f_f$ is used in the feedback control.

The viscosity of glass which constitutes the preform 50 is given as a function of temperature and hence, the viscosity $\eta_f$ of the fused lower end 50c of the preform 50 is obtained from the furnace temperature. On the other hand, the tension $T_f$ given to the optical fiber 10 is obtained from the dynamometer 83. Here, the tension $T_f$ necessary for achieving a given fiber drawing speed $V_b$ at a given viscosity $\eta_f$ and a given fiber diameter $d_f$ is determined if the area fraction of the voids $f_f$ in the optical fiber 10 is given and decreases corresponding to the increase in the area fraction of the voids $f_f$ in the optical fiber 10. Here, since parameters other than the area fraction of the voids $f_f$ are known values, it is possible to obtain the area fraction of the voids $f_f$ from the above relationship.

In any one of these embodiments, the microstructured optical fiber which changes the area fraction of the voids along the fiber axis can be easily formed. Further, it is no more necessary to perform the operation to combine a large number of tubes or rods at a given arrangement which has been necessary in the conventional fabrication method and hence, the labor saving can be achieved and the reproducibility of the operation can be enhanced whereby products having a stable quality can be fabricated. Further, since the preform does not contain the gaps among combined tubes and/or rods, the removal of the contaminants and the pressure control during fiber drawing can be effectively performed.

These embodiments are applicable not only to a case in which the microstructured optical fiber which changes the area fraction of the voids along the fiber axis is fabricated but also a case in which a microstructured optical fiber which has the uniform voids is fabricated. By performing the feedback control of the area fraction of the voids, the accuracy of the uniformity of the voids can be further enhanced compared with the voids formed by the conventional technique.

Further, in the cleaning step to clean the surface of the voids in the preform, it is possible to perform at least one of the following step in addition to the cleaning by hydrofluoric acid: (1) a step which makes the wall surfaces of the voids 13 smooth by etching it with $SF_6$ gas, and (2) a step which removes contaminants in the voids 13 by repeating evacuation of the voids 13 and filling of a clean inert gas in the voids 13. Further, it is possible to fill chlorine gas in the voids 13 and then to perform the fiber drawing so as to reduce a contaminant on the wall surfaces and in the voids 3 of the optical fiber 10 thereby further decreasing the transmission loss.

These embodiments are also applicable to a case in which a sub medium made of a material other than gas is filled in the voids 13 of the preform 50. In this case, the perform 50 which fills the sub medium in the voids 13 is prepared and thereafter the fiber drawing is performed using the fiber drawing device shown in FIG. 9 or FIG. 10. To adjust the area fraction of the sub-medium regions, the furnace temperature of the fiber drawing furnace 60 or the heating time of the preform may be adjusted. When the sub medium is a liquid, the above-described technique which adjusts the pressure in the sub medium can be adopted. Since the above-described technique to obtain the area fraction of the voids can also be used to obtain the area fraction of the sub-medium regions, the detail of the technique is omitted.

Subsequently, the fabrication method of an optical fiber according to the third embodiment is explained. This third embodiment is characterized by a preform manufacturing step, and more particularly by a step for forming voids.

Figure 11:
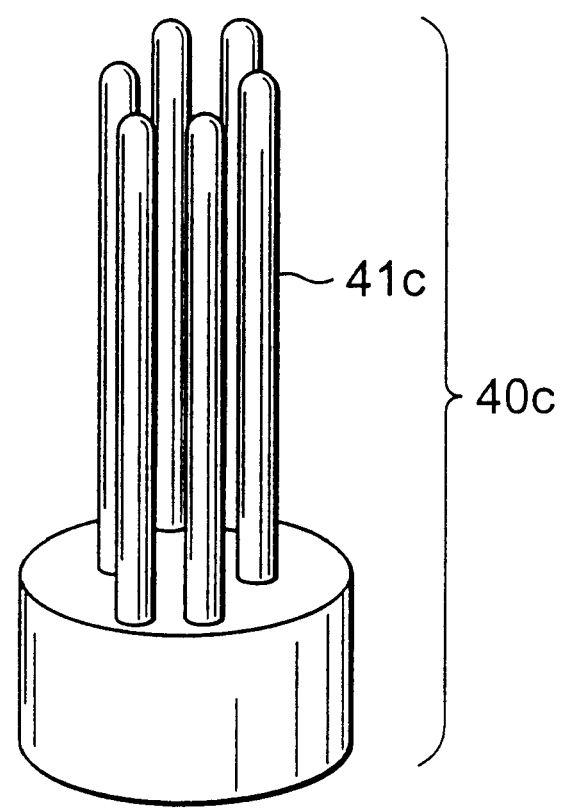
FIG. 11 is a view for explaining the boring instrument used in a third embodiment of the fabrication method of microstructured optical fiber according to the present invention.

FIG. 11 is a view showing a boring appliance 40c used in this third embodiment. This boring appliance 40c includes three or more (six in the drawing) bar-like protruding portions 41c made of carbon having a melting point higher than the softening point of silica glass constituting the preform 50.

Figure 12:
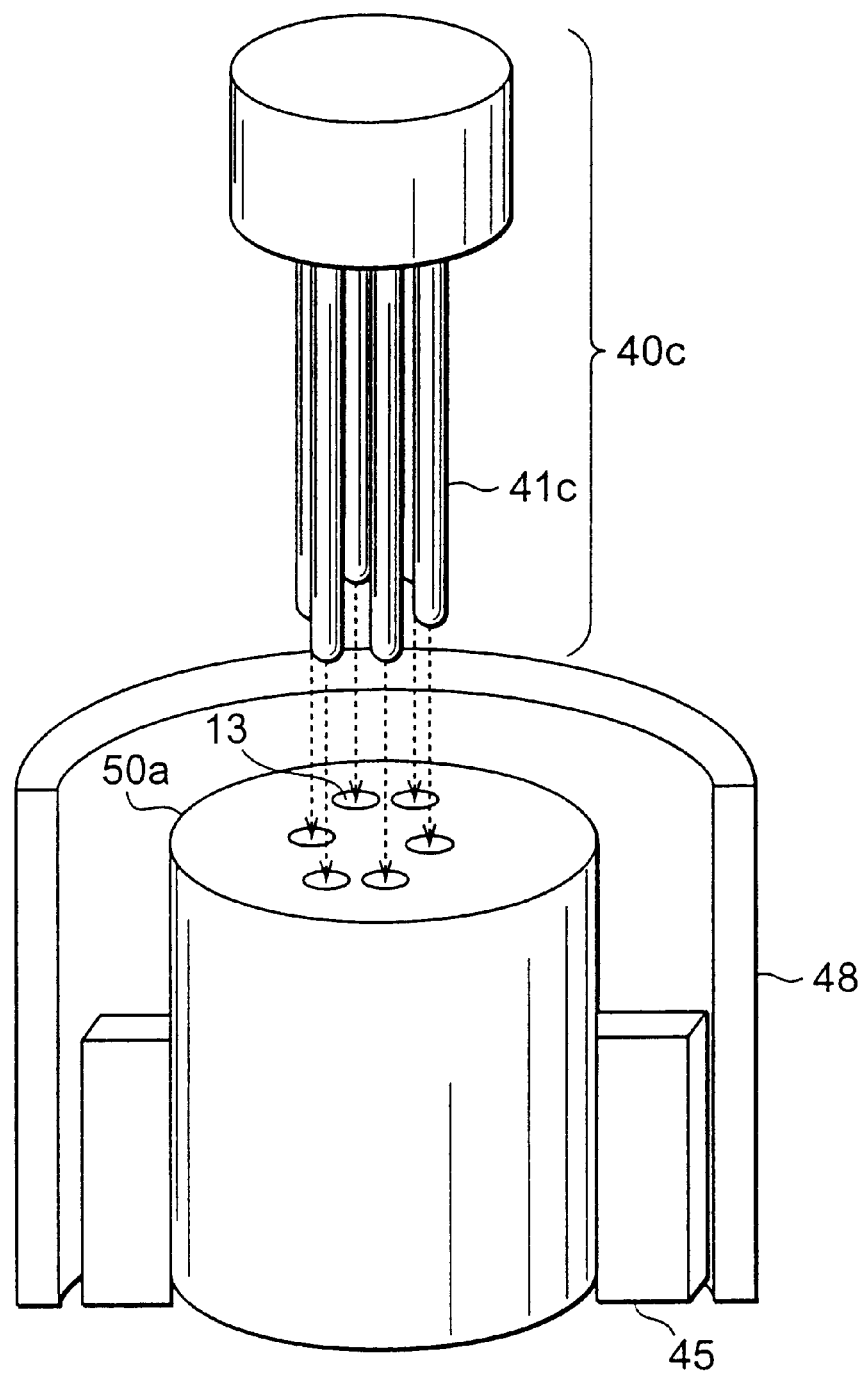
FIG. 12 is a perspective view explaining a technique for boring the preform using such boring instrument.

FIG. 12 is a view for explaining a step for forming voids (a boring step) according to this embodiment. A base material 50a which uses silica glass as a main component material is fixedly secured by fixing means 45 and the base material 50a is heated by a heater 48 up to a temperature higher than the softening point of the base material 50a and lower than the melting point of carbon. After lowering the viscosity of silica glass which constitutes the base material 50a by heating, protruding portions 41c of the boring appliance 40c are brought into contact with an upper end surface of the base material 50a and the protruding portions 41c are moved along the center axis of the base material 50a at a given speed in a state that the axes of the protruding portions 41c are maintained in parallel with the center axis of the base material 50a so as to make distal ends of the protruding portions 41c penetrate the base material 50a from the bottom end of the base material 50a. Thereafter, by moving the protruding portions 41c in a reverse direction, the protruding portions 41c are pulled out from the base material 50a so that six voids 13 extending in the axial direction are formed in these base material 50a whereby the preform 50 having the voids 13 can be fabricated.

If the viscosity of the base material 50a remains low when the temperature of the base material 50a is held higher than the softening point, the voids 13 tend to deform. Accordingly, it is preferable to suppress the deformation of the voids 13 by suppressing the heating by the heater 48 and lowering the temperature of the base material 50a to a temperature below the softening point before or immediately after pulling out the protruding portions 41c of the boring appliance 40c.

In such a boring step, by changing the arrangement of the protruding portions 41c of the boring appliance 40c, the arrangement of the voids 13 in the preform 50 can be easily changed. Particularly, even when the number and kind of the voids 13 are large or even when the arrangement is complicate, a large number of preforms 50 of the same kind can be fabricated with a favorable reproducibility so that the yields of the optical fibers obtained after fiber drawing can be enhanced.

An optical fiber can be obtained by drawing the preform formed in this manner using the fabrication device shown in FIG. 9 or FIG. 10 and advantageous effects similar to those of the first and second embodiments can be achieved.

A fourth embodiment and a fifth embodiment which will be explained hereinafter are both directed to a method for making an optical fiber which changes the refractive index distribution along its axis by further processing the optical fiber fabricated by the first to third embodiments.

First of all, the fourth embodiment is directed to a method for making an optical fiber which fills a sub medium 5 in voids 3d of an optical fiber 10d fabricated in the first to third embodiments and changes the refractive index distribution of the fiber along its axis by changing the refractive index of sub medium 5 along the fiber axis.

Figure 13:
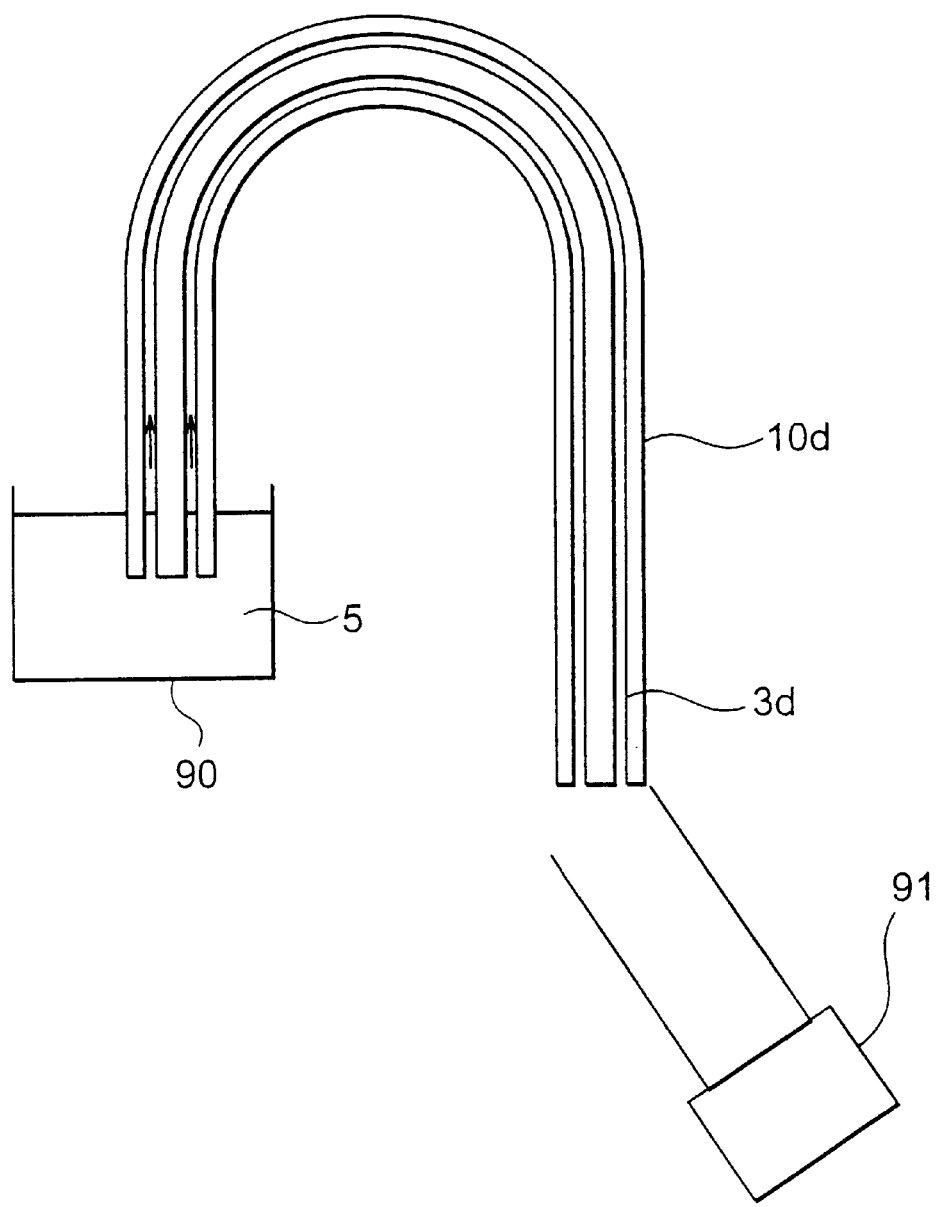
FIG. 13 is a schematic view for explaining a technique to form a sub medium in a fourth embodiment of the fabrication method of microstructured optical fiber according to the present invention.
Figure 14:
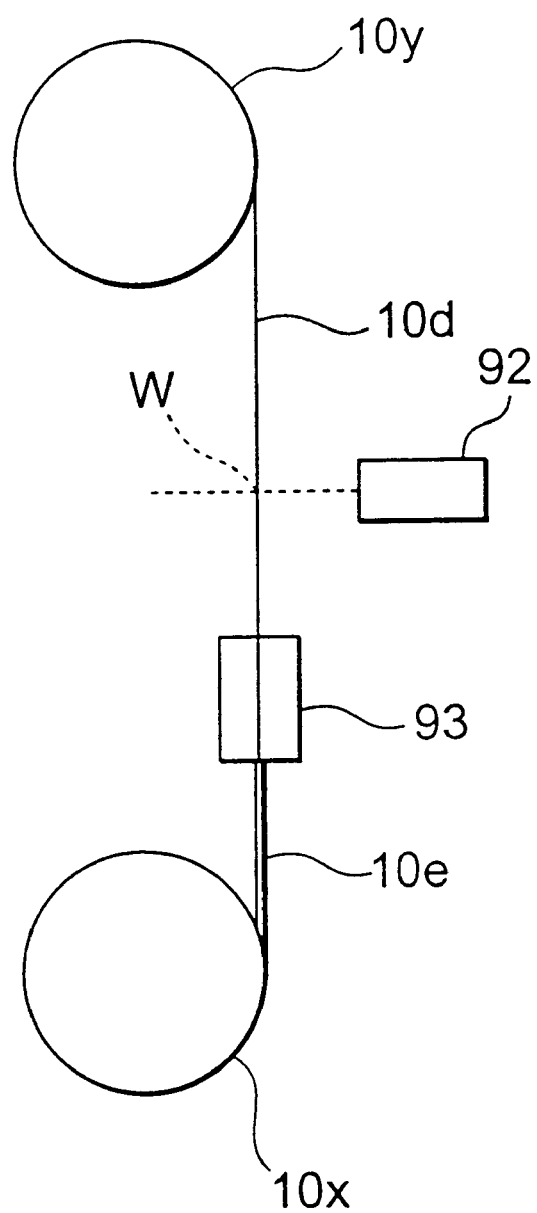
FIG. 14 is a schematic view for explaining the technique for adjusting the refractive index adjusting method.

FIG. 13 shows a sub-medium forming step of this embodiment and FIG. 14 shows a refractive index adjusting step of this embodiment. As shown in FIG. 13, the optical fiber 10d having the voids 3d extending along the fiber axis has one end thereof immersed in a liquid 5 stored in a vessel 90. As the liquid 5, a material which generates a phase change or a molecular structure change on exposure to various radiations (electromagnetic waves including ultraviolet rays, visible light and infrared rays, electron rays, a rays or the like) and hence changes the refractive index can be selected. By reducing the atmospheric pressure in the vicinity of another end of the optical fiber 10d using suction means 91, it becomes possible to fill the inside of the voids 3d with this liquid 5. Thereafter, both ends of the optical fiber are sealed. Due to the above-mentioned steps, an optical fiber having microstructured regions made of the sub medium (liquid 5) and extending along the fiber axis can be formed. Although not shown in the drawing, the optical fiber 10d may be wound around a drum or the like.

Subsequently, in refractive index adjusting step, as shown in FIG. 14, the optical fiber 10d filled with the liquid 5 as the sub medium is supplied from a supply drum 10Y to a winding drum 10X at a given speed. Then, at a position W between the supply drum 10Y and the winding drum 10X, by exposing this liquid 5 which has sensitivity (the refractive index thereof being changed on exposure) to radiation from the side surface of the optical fiber 10d by means of radiation exposing means 92, the refractive index of the liquid 5 can be changed to a desired value. By suitably covering the optical fiber 10d with covering means 93 after exposure to radiation, the strength of the optical fiber 10d can be enhanced. A covered optical fiber 10e formed in this manner is wound around the winding drum 10x.

The optical fiber making method according to this embodiment, different from the conventional dispersion managed fiber, adopts the radiation sensitive materials in a wide range as the sub medium and hence, an optical fiber in which the refractive index of small regions made of the sub medium is largely changed along the fiber axis can be fabricated. Further, since the formation of the change of the refractive index is performed not in the preform but in the fiber, an optical fiber in which the refractive index of the small regions made of sub medium is sharply changed along the fiber axis can be fabricated.

Figure 15:
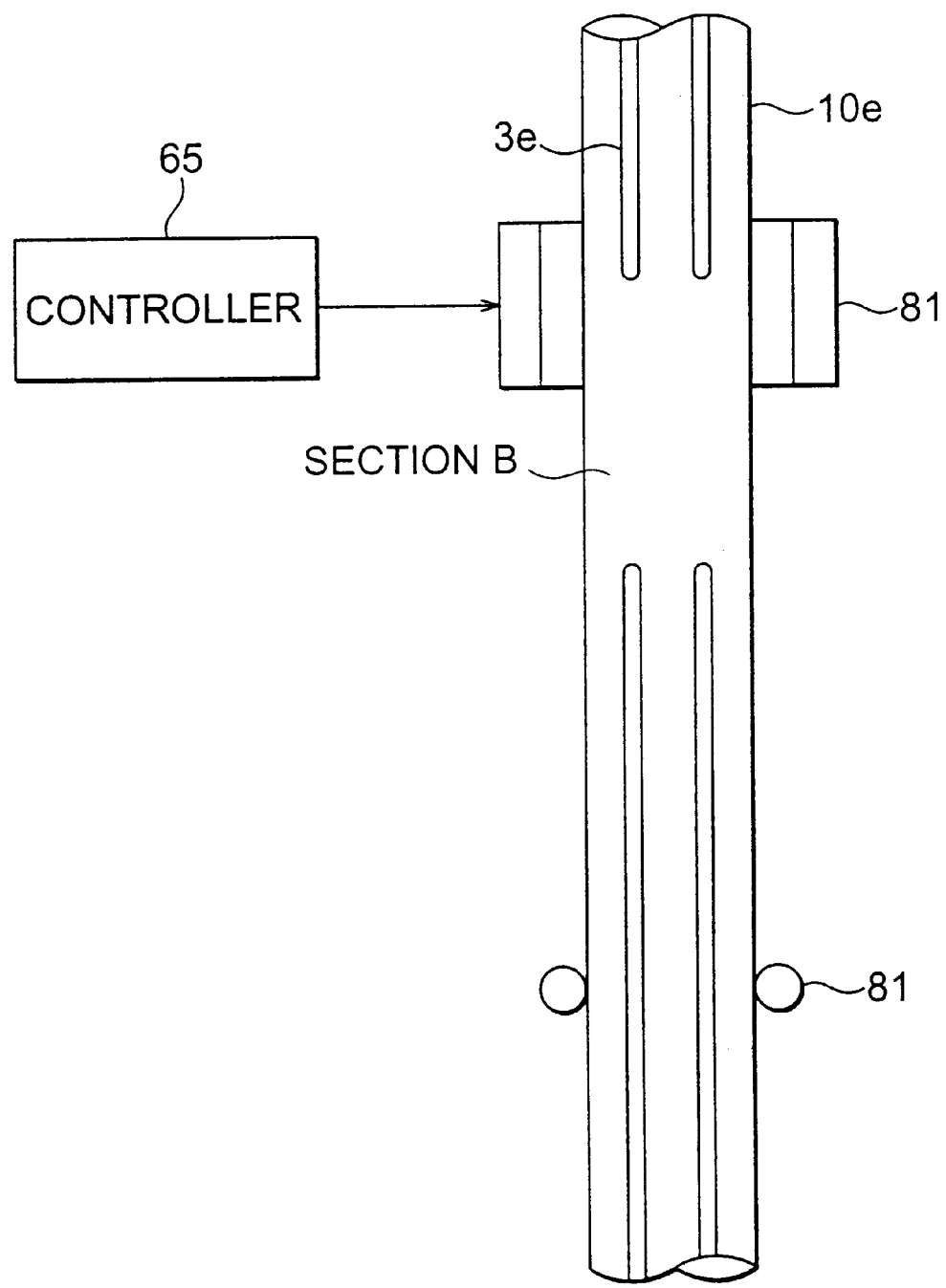
FIG. 15 is a schematic view for explaining a void closing step of fourth embodiment of the fabrication method of microstructured optical fiber according to the present invention.

A fifth embodiment is directed to a method for selectively closing voids 3e of an optical fiber 10e fabricated by fiber drawing. FIG. 15 is a view for explaining this closing processing step. It is preferable that this closing processing step is performed immediately before or immediately after the operation of a towing device 81 in a fiber drawing device shown in FIG. 9 and FIG. 10 (in the drawing, an example which performs the processing immediately before the operation by the towing device 81 is shown). A heater 85 is arranged at a position closer to the preform side than the drawing device 81 and this heater 85 selectively performs the heating of the optical fiber 10e upon receiving a command from a controller 65. Although given voids 3e are formed in the optical fiber 10e by the fabrication method of the first to the third embodiments, at a position selectively heated by the heater 85, silica glass which constitutes a main medium of the optical fiber 10e is fused and, as a result, the voids 3e at a position above are closed whereby a section B shown in FIG. 1 can be formed.

Since the fiber drawing step and the void closing processing step are separated in this embodiment, it is unnecessary to change a fiber drawing environment during fiber drawing to form the change of the cross-sectional area of the voids along the fiber axis and hence, the fabrication of the optical fiber can be facilitated. Further, since the formation of the change of the cross-sectional area of the voids along the fiber axis is not performed in the preform but in the fiber, the optical fiber in which the cross-sectional area of the voids is sharply changed along the fiber axis can be fabricated.

What is claimed is:

1. An optical fiber composed of:
    at least a section of the first kind having chromatic dispersion not less than a given positive value x and negative chromatic dispersion slope at a given wavelength; and
    at least a section of the second kind having chromatic dispersion not more than −x and positive chromatic dispersion slope at said given wavelength, wherein said optical fiber is composed of a core and a cladding which surrounds said core and has a mean refractive index lower than that of said core, at least one of said core and cladding includes regions spaced apart in cross section and made of sub mediums whose refractive indices are different from those of main mediums constituting the optical fiber, and at least one of the cross-sectional areas and the refractive indices of the regions made of the sub mediums change along the fiber axis.

2. An optical fiber according to claim 1, wherein the chromatic dispersion at the given wavelength is larger than 1 ps/nm/km in said section of the first kind and smaller than −1 ps/nm/kin in said section of the second kind and the total length of the fiber sections whose absolute values of the chromatic dispersion are below 1 ps/nm/km is less than ⅒ of the full length of the optical fiber.

3. An optical fiber according to claim 1, wherein sections which do not contain sub mediums are spaced apart along the fiber axis.

4. An optical fiber according to claim 1, wherein at least one of the cross-sectional areas and the refractive indices of the regions made of the sub mediums change at a given period along the fiber axis and the other are uniform or change at the same period along the fiber axis.

5. An optical fiber according to claim 4, wherein the given period exceeds 1 m.

6. An optical fiber according to claim 1, further composed of at least a transition section of a cross-sectional areas and the refractive indices of the regions made of the sub mediums change continuously along the fiber axis and the other are uniform or change continuously along the fiber axis.

7. An optical fiber according to claim 1, wherein said main medium is silica glass and said sub medium is air.

8. An optical fiber, having chromatic dispersion not less than a positive value x and negative chromatic dispersion slope at a given wavelength, composed of a core and a cladding surrounding the core and having a lower mean refractive index than that of said core, wherein at least one of said core and cladding has regions spaced apart in cross section and made of sub mediums whose refractive indices are different from those of main mediums constituting the core and the cladding.

* * * * *